(12) United States Patent
Urban

(10) Patent No.: US 10,265,915 B2
(45) Date of Patent: Apr. 23, 2019

(54) COMPOSITE BONDED REPAIR METHOD

(71) Applicant: Sikorsky Aircraft Corporation, Stratford, CT (US)

(72) Inventor: Michael R. Urban, Southbury, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 941 days.

(21) Appl. No.: 14/158,077

(22) Filed: Jan. 17, 2014

(65) Prior Publication Data
US 2015/0203217 A1   Jul. 23, 2015

(51) Int. Cl.
| | | |
|---|---|---|
| *B29C 73/02* | (2006.01) | |
| *B29C 73/10* | (2006.01) | |
| *B64C 1/12* | (2006.01) | |
| *B64F 5/40* | (2017.01) | |
| *B33Y 80/00* | (2015.01) | |

(52) U.S. Cl.
CPC .............. *B29C 73/02* (2013.01); *B29C 73/10* (2013.01); *B33Y 80/00* (2014.12); *B64C 1/12* (2013.01); *B64F 5/40* (2017.01)

(58) Field of Classification Search
CPC ......... B64C 1/12; B64F 5/0081; B29C 73/10; B29C 73/02
See application file for complete search history.

(56) References Cited

U.S. PATENT DOCUMENTS

| | | |
|---|---|---|
| 4,352,707 A | 10/1982 | Wengler et al. |
| 4,855,182 A | 8/1989 | Ondrejas et al. |
| 5,580,502 A | 12/1996 | Forster |
| 5,618,606 A | 4/1997 | Sherrick et al. |
| 6,149,749 A | 11/2000 | McBroom |
| 6,174,392 B1 | 1/2001 | Reis |
| 6,468,372 B2 | 10/2002 | Kociemba et al. |
| 6,761,783 B2 | 7/2004 | Keller et al. |
| 7,325,771 B2 | 2/2008 | Stulc et al. |
| 7,624,491 B2 | 12/2009 | Polus |
| 7,793,481 B2 | 9/2010 | Polus |
| 7,857,925 B2 | 12/2010 | Keller et al. |
| 7,867,928 B2 | 1/2011 | Toni et al. |
| 7,981,519 B2 | 7/2011 | Holland et al. |
| 8,038,099 B2 | 10/2011 | Anast et al. |
| 8,043,453 B2 | 10/2011 | Sawicki et al. |

(Continued)

FOREIGN PATENT DOCUMENTS

| | | |
|---|---|---|
| DE | 102008021788 A1 | 11/2009 |
| DE | 102010046580 A1 | 3/2012 |

(Continued)

OTHER PUBLICATIONS

International Search Report issued in PCT/US15?11576, dated Apr. 10, 2015; 8 pages.

(Continued)

*Primary Examiner* — Philip J Bonzell
(74) *Attorney, Agent, or Firm* — Cantor Colburn LLP

(57) ABSTRACT

A composite bonded repair method for an aircraft is provided. The method includes generating a doubling patch of a portion of the aircraft from topographic data, filling damage at the portion of the aircraft with filler material, applying adhesive to the portion of the aircraft and the filler material and adhering the doubling patch to the adhesive.

15 Claims, 3 Drawing Sheets

(56) References Cited

U.S. PATENT DOCUMENTS

| | | |
|---|---|---|
| 8,088,317 B1 | 1/2012 | Karem |
| 8,108,979 B2 | 2/2012 | Stadtlander et al. |
| 8,209,838 B2 | 7/2012 | Lindgren |
| 8,218,852 B2 | 7/2012 | Cork et al. |
| 8,220,154 B2 | 7/2012 | Cacciaguerra |
| 8,826,534 B2 * | 9/2014 | Cappelli et al. ............ 29/889.1 |
| 2008/0281554 A1 | 11/2008 | Cork et al. |
| 2009/0154775 A1 | 6/2009 | Lea et al. |
| 2009/0234616 A1 | 9/2009 | Perkins |
| 2009/0258185 A1 | 10/2009 | Holland et al. |
| 2009/0282664 A1 | 11/2009 | Holzhuter |
| 2010/0161095 A1 | 6/2010 | Lindgren |
| 2011/0011518 A1 | 1/2011 | Carstensen et al. |
| 2012/0080135 A1 | 4/2012 | Evens et al. |
| 2013/0014367 A1 | 1/2013 | Miller et al. |
| 2013/0082088 A1* | 4/2013 | Dighe et al. ............... 228/112.1 |
| 2013/0152389 A1 | 6/2013 | Cappelli |
| 2013/0160923 A1 | 6/2013 | Stehmeiner et al. |
| 2013/0192381 A1 | 8/2013 | Becker et al. |
| 2013/0255856 A1 | 10/2013 | Whitworth et al. |

FOREIGN PATENT DOCUMENTS

| | | |
|---|---|---|
| EP | 2644366 A1 | 10/2013 |
| JP | 2002511030 A | 4/2002 |
| JP | 2008514484 A | 5/2008 |
| JP | 2013503763 A | 2/2013 |
| WO | 2012062253 A2 | 5/2012 |

OTHER PUBLICATIONS

Written Opinion issued in PCT/US15?11576, dated Apr. 10, 2015; 5 pages.

EP15737594.0—Extended European Search Report dated Aug. 7, 2017, 8 pages.

* cited by examiner

COMPOSITE BONDED REPAIR METHOD

BACKGROUND OF THE INVENTION

The subject matter disclosed herein relates to a composite bonded repair method and, more particularly, to an advanced integrated composite bonded repair method and an aircraft including a composite bonded repair.

Composite structures are increasingly prevalent in various aircrafts and naval structures and, as piloted, remote piloted, autonomous aircraft and ship structures evolve, the use of metallic components is waning. This transformation is very evident in certain aircrafts, such as helicopters, in particular, which make extensive use of carbon/epoxy in both rotating and non-rotating structural components. This mix of structural materials offers many benefits to reduce lifetime costs and introduces new requirements for optimized field support.

The carbon/epoxy mix of structural materials in helicopters and other aircraft incorporates a significant amount of honeycomb stiffened structures in the skins, access panels, doorways, ramps and floors. While the structural materials have been developed to be highly impact damage resistant and tolerant, transport can introduce scenarios of potential damage. Moreover, cramped spaces and confined passageways aboard ships can raise the probability of accidental handling damage. In addition, working on and moving helicopters and other aircraft within a ship that is pitching and rolling can increase the probability of mechanically induced damage.

The same ship board environments that raise the probability of mechanical damage can also limit the capability of onboard repairs. Limited space onboard ships can restrict maintenance when compared to land based operations.

BRIEF DESCRIPTION OF THE INVENTION

According to one aspect of the invention, a composite bonded repair method for an aircraft is provided. The method includes generating a doubling patch of a portion of the aircraft from topographic data, filling damage at the portion of the aircraft with filler material, applying adhesive to the portion of the aircraft and the filler material and adhering the doubling patch to the adhesive.

According to another aspect of the invention, a composite bonded repair method for an aircraft is provided. The method includes generating topographic data of a portion of an outer skin of an aircraft surrounding damage formed in the outer skin, generating a doubling patch of the portion of the outer skin of the aircraft from the topographic data, filling the damage with a filler material, applying adhesive to the portion of the outer skin of the aircraft and the filler material and adhering the doubling patch to the adhesive.

According to yet another aspect of the invention, an aircraft is provided and includes an outer skin including fuselage sections and aerodynamic elements, filler material disposed in damage formed in the outer skin, adhesive applied to a portion of the outer skin surrounding the damage and a doubling patch adhered to the adhesive. The doubling patch is formed from topographic data of the portion of the outer skin surrounding the damage.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
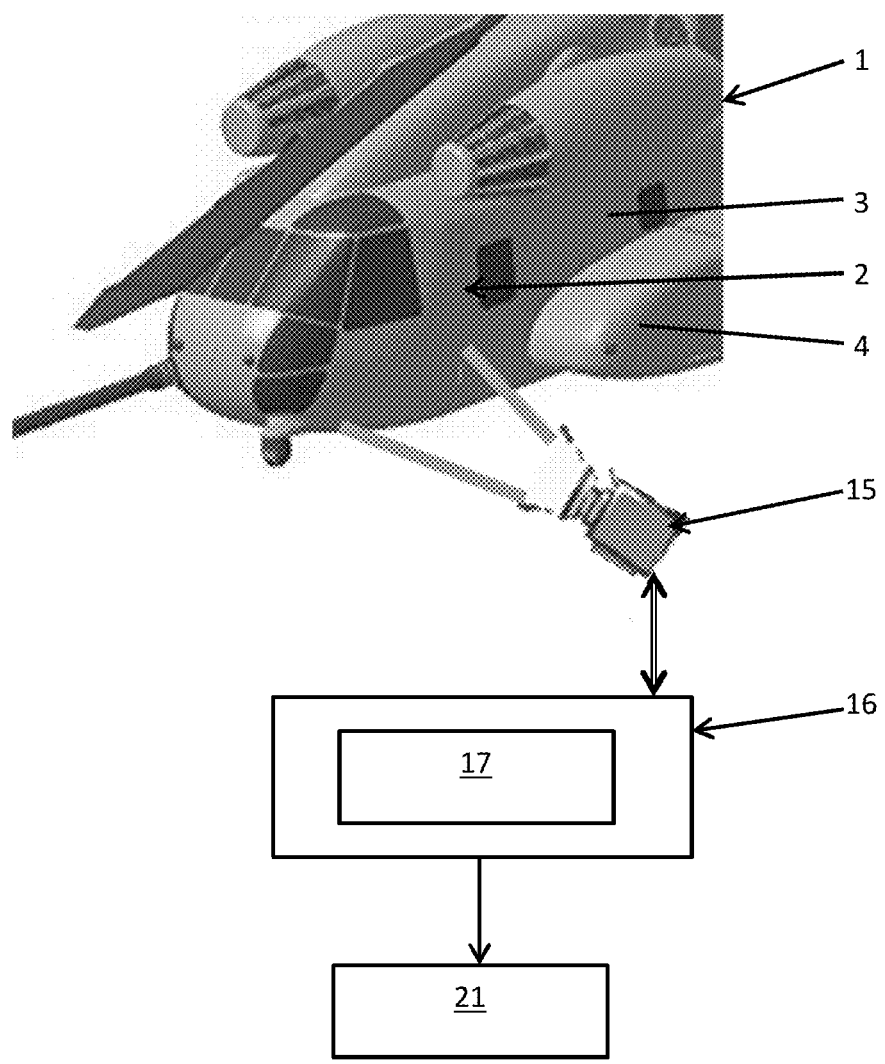
FIG. 1 is a perspective view of an aircraft.

With reference to FIG. 1, an aircraft 1 is provided and may be a helicopter, an airplane or any other similar device. The aircraft 1 includes an outer skin 2 and the outer skin 2 includes fuselage sections 3 and aerodynamic elements 4. The fuselage sections 3 define an interior of the aircraft in which navigational components are housed and, in the case of manned aircraft, the pilot and passengers sit. The aerodynamic elements 4 include wings and other similar features. In accordance with aspects as will be discussed below, damage to the outer skin 2 may be caused by transport of the aircraft 1, maintenance of the aircraft 1 and or impacts during flight. Such damage may be repaired by filler material being disposed in the damaged sections such that the damaged sections are filled, adhesive being applied to the outer skin 2 around the damaged sections and a doubling patch being adhered to the adhesive where the doubling patch is formed from topographic data of the outer skin 2.

Figure 2:
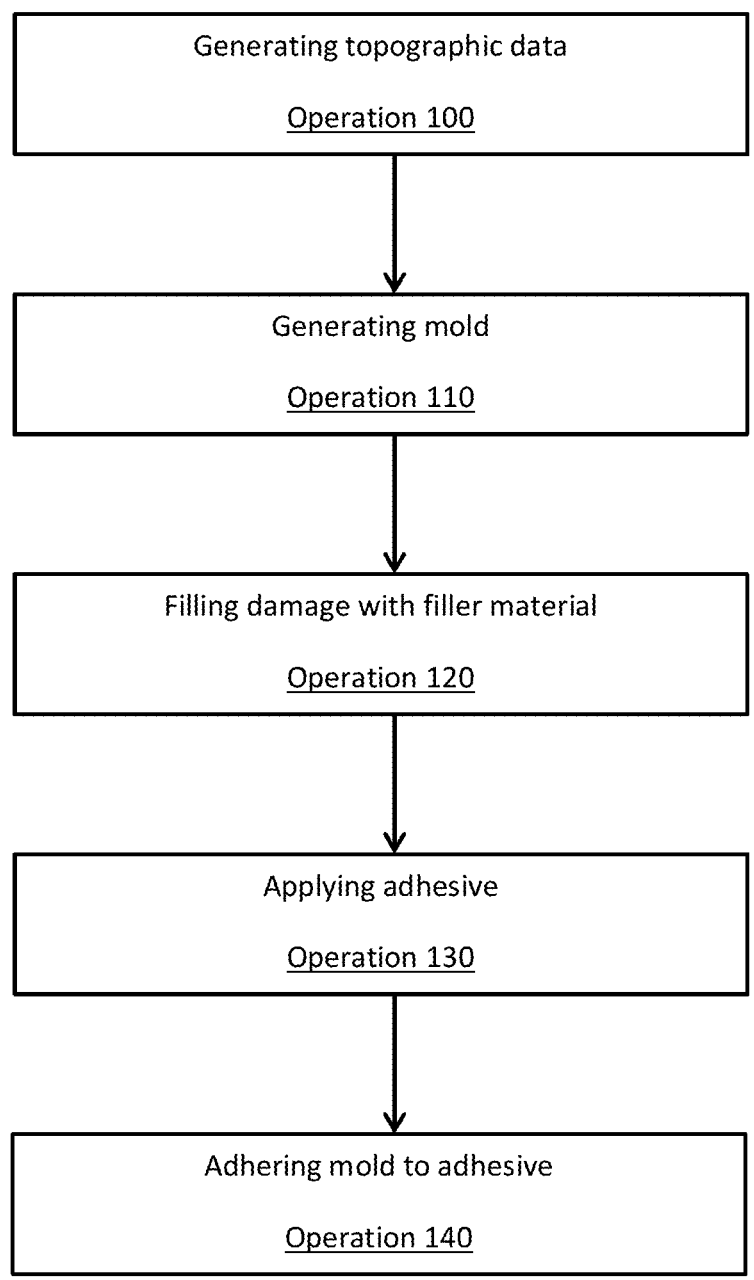
FIG. 2 is a flow diagram illustrating a composite bonded repair method for use with the aircraft in accordance with embodiments.
Figure 3:
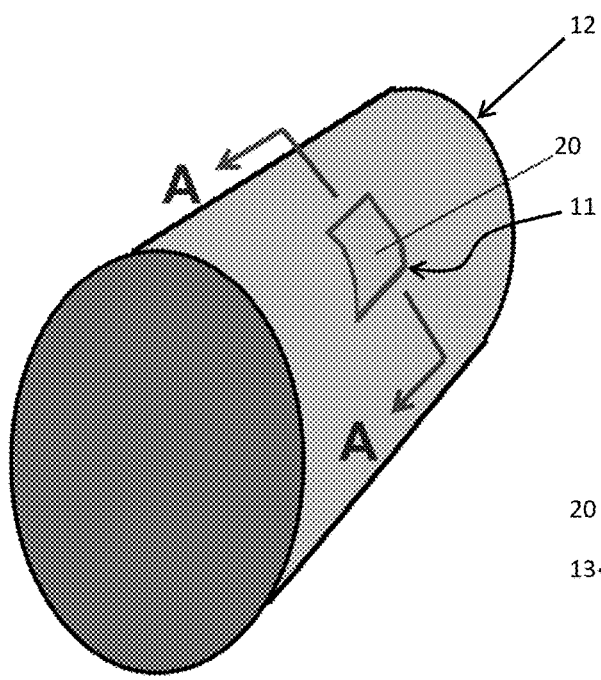
FIG. 3 is a perspective view of a repaired portion of an aircraft in accordance with embodiments.
Figure 4:
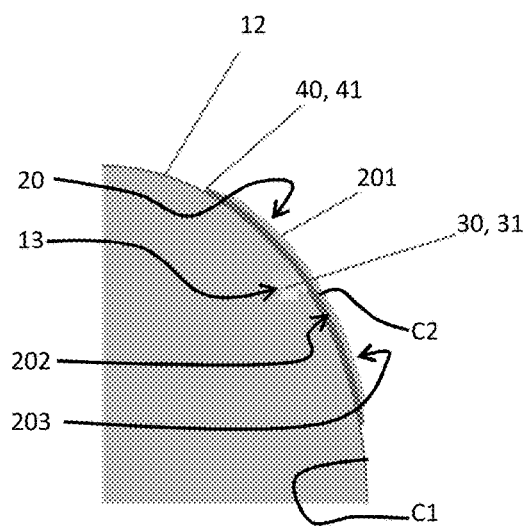
FIG. 4 is a side view of the repaired portion taken along line A-A of FIG. 3.

With reference to FIGS. 2-4, a composite bonded repair method for an aircraft, such as the aircraft 1 of FIG. 1, is provided. The method includes generating topographic data of a portion 11 of an outer skin 12 of an aircraft where the portion 11 is defined to surround damage 13 formed in the outer skin 12 (operation 100). The generating of the topographic data may include at least one of scanning the portion 11 of the outer skin 12 of the aircraft with a scanning unit 15 (see FIG. 1) coupled to a computing device 16 (see FIG. 1) and deriving data from a model of the aircraft stored in memory units or storage 17 (see FIG. 1) of the computing device 16.

The method further includes generating a doubling patch 20 of the portion 11 of the outer skin 12 of the aircraft from the topographic data (operation 110). The generating of the doubling patch 20 may be accomplished by three-dimensional (3-D) printing processes executed by a 3-D printing element 21 (see FIG. 1) or by forming on a mold through similar three-dimensional (3-D) printing processes. The doubling patch 20 and/or the mold may be formed of non-metallic material, such as graphite or fiberglass cloth. As shown in FIG. 3, the doubling patch 20 includes body 201 having an inner surface 202 and an outer surface 203, which is opposite the inner surface 202. The inner surface 202, in particular, has a shape that corresponds to a shape of the portion 11 of the outer skin 12 of the aircraft. That is, where the portion 11 of the outer skin 12 has a continuously variable external contour with curvature C1, the inner surface 202 may have a similarly continuously variable external contour with curvature C2. The outer surface 203 can have a similar curvature as the inner surface 202 or a different shape altogether.

The method further includes filling the damage 13 with a filler material 30 (operation 120), applying adhesive 40 to the portion 11 of the outer skin 12 of the aircraft and the filler material 30 (operation 130) and adhering the doubling patch 20 to the adhesive 40 (operation 140). In accordance with embodiments, the filler material 30 may include graphite epoxy 31 or another similar material and the adhesive 40 may include two-sided tape or film or paste adhesive 41. In accordance with further embodiments, the adhesive 40 may include strain monitoring elements, such as fiber optic strain sensors, while the adhering of the doubling patch 20 to the adhesive 40 may include at least one of vacuum pressurizing the doubling patch 20 toward the portion 11 of the outer skin 12 of the aircraft and applying a three-dimensional printed form block onto the doubling patch 20.

Repairs completed by the repair method described above can be subject to at least three or more mechanical loading forms including static, ultimate and limit loading. All repairs would be required to restore full quasi-static load carrying capability, they should hold up under cyclic loading for a predetermined period and they should be resistant to high strain rate load induced by impact, ballistics and other rate dependent loadings. While the repair method described above can stand on its own, fastened or hybrid-fastened/bonded connections may be required in certain situations. Thus, when they are needed, fasteners can be provided to maintain the doubling patch 20, the filler material 30 and the adhesive 40 in position at least as long as needed for the adhesive 40 to cure.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A composite bonded repair method for an aircraft, the method comprising:
   generating a doubling patch of a damaged portion of the aircraft from topographic data;
   filling the damaged portion of the aircraft with filler material;
   applying adhesive to the damaged portion of the aircraft and the filler material; and
   adhering the doubling patch to the adhesive.

2. The method according to claim 1, further comprising generating the topographic data by at least one of scanning the portion of the aircraft and deriving data from a model of the aircraft.

3. The method according to claim 1, wherein the generating of the doubling patch comprises three-dimensional printing.

4. The method according to claim 1, wherein the doubling patch comprises non-metallic material.

5. The method according to claim 1, wherein the filler material comprises graphite epoxy.

6. The method according to claim 1, wherein the adhesive comprises two-sided tape or film or paste adhesive.

7. The method according to claim 1, wherein the adhering of the doubling patch comprises at least one of vacuum pressurizing the doubling patch toward the portion of the aircraft and applying a three-dimensional printed form block onto the doubling patch.

8. A composite bonded repair method for an aircraft, the method comprising:
   generating topographic data of a portion of an outer skin of an aircraft surrounding damage formed in the outer skin;
   generating a doubling patch of the portion of the outer skin of the aircraft from the topographic data;
   filling the damage with a filler material;
   applying adhesive to the portion of the outer skin of the aircraft and the filler material; and
   adhering the doubling patch to the adhesive.

9. The method according to claim 8, wherein the generating of the topographic data comprises at least one of scanning the portion of the outer skin of the aircraft and deriving data from a model of the aircraft.

10. The method according to claim 8, wherein the generating of the doubling patch comprises three-dimensional printing.

11. The method according to claim 8, wherein the doubling patch comprises non-metallic material.

12. The method according to claim 8, wherein the filler material comprises graphite epoxy.

13. The method according to claim 8, wherein the adhesive comprises two-sided tape or film or paste adhesive.

14. The method according to claim 8, wherein the adhering of the doubling patch comprises at least one of vacuum pressurizing the doubling patch toward the portion of the outer skin of the aircraft and applying a three-dimensional printed form block onto the doubling patch.

15. An aircraft, comprising:
   an outer skin including fuselage sections and aerodynamic elements;
   a filler material disposed in a damaged portion of the outer skin;
   an adhesive applied to a portion of the outer skin surrounding the damaged portion; and
   a doubling patch adhered to the adhesive, the doubling patch being formed from topographic data of the portion of the outer skin surrounding the damaged portion.

* * * * *